W. R. GWIN.
BEET PLANT THINNING MACHINE.
APPLICATION FILED SEPT. 3, 1918.

1,331,148.

Patented Feb. 17, 1920.
2 SHEETS—SHEET 1.

INVENTOR,
W. R. Gwin
By *[signature]*
HIS ATTORNEY.

W. R. GWIN.
BEET PLANT THINNING MACHINE.
APPLICATION FILED SEPT. 3, 1918.
1,331,148.
Patented Feb. 17, 1920.
2 SHEETS—SHEET 2.
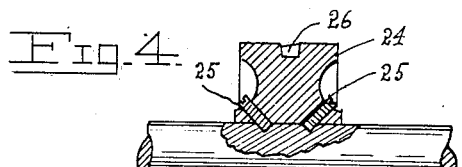
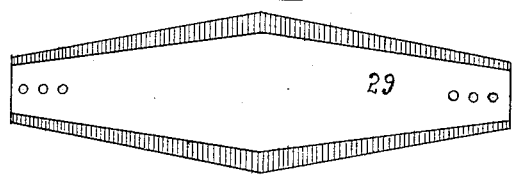
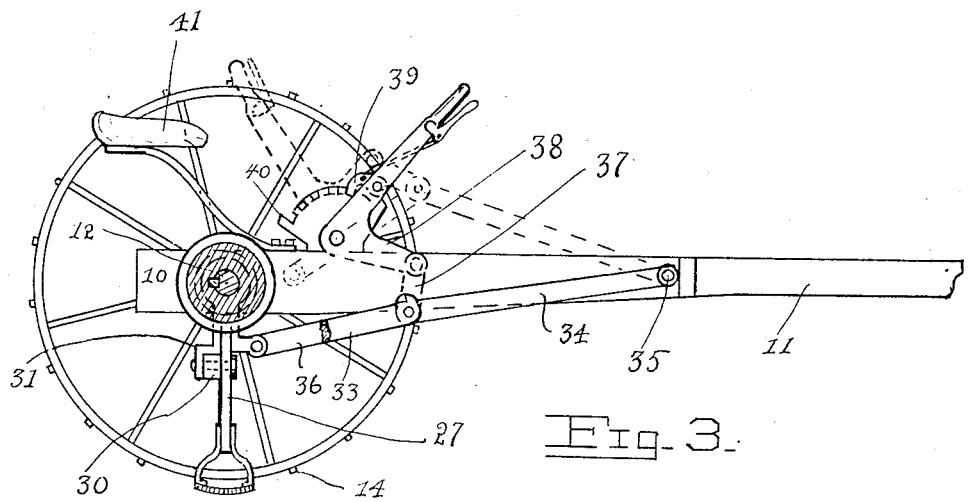
INVENTOR,
W. R. Gwin
HIS ATTORNEY.

UNITED STATES PATENT OFFICE.

WALTER R. GWIN, OF LOS ANGELES, CALIFORNIA.

BEET-PLANT-THINNING MACHINE.

1,331,148.  Specification of Letters Patent.  Patented Feb. 17, 1920.

Application filed September 3, 1918. Serial No. 252,320.

*To all whom it may concern:*

Be it known that I, WALTER R. GWIN, a citizen of the United States, residing at the city of Los Angeles, county of Los Angeles, State of California, have invented new and useful Improvements in Beet-Plant-Thinning Machines, of which the following is a specification.

My invention relates to a machine which is drawn along the rows of beet plants and automatically cuts out predetermined spaced portions of the plants in the row; and the object thereof is to produce a machine of simple construction and great capacity and automatic in operation for thinning beet plants.

In the drawings forming a part of this application:

Fig. 3 is a section on the line 3 of Fig. 1.

Figs. 4 and 5 are enlarged detail views.

Figure 1:
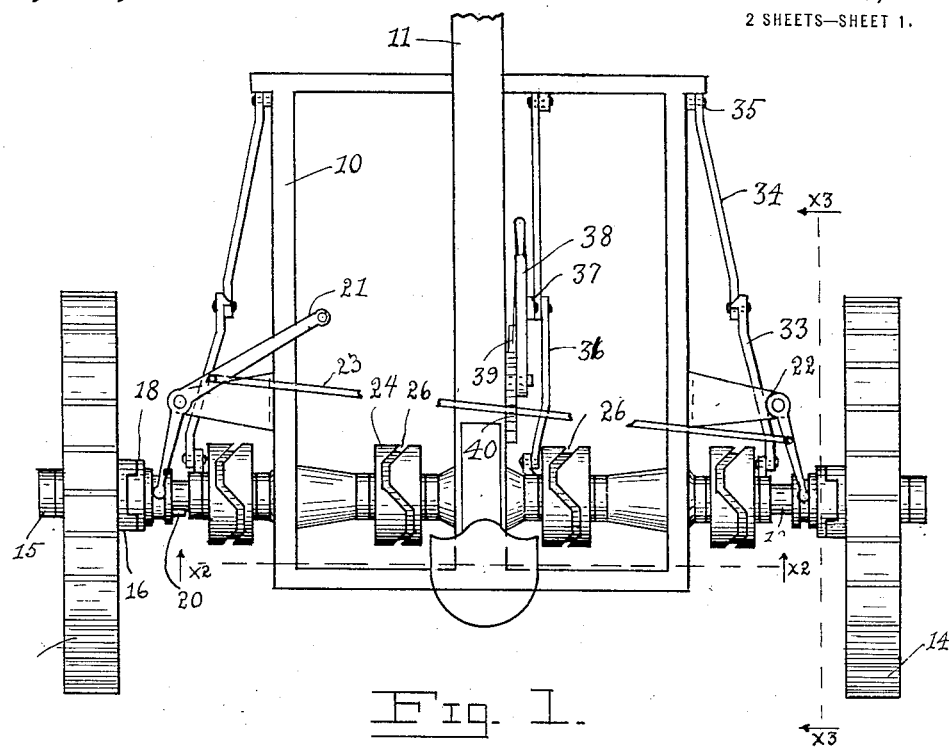
Figure 1 is a top plan of a four row machine.
Figure 2:
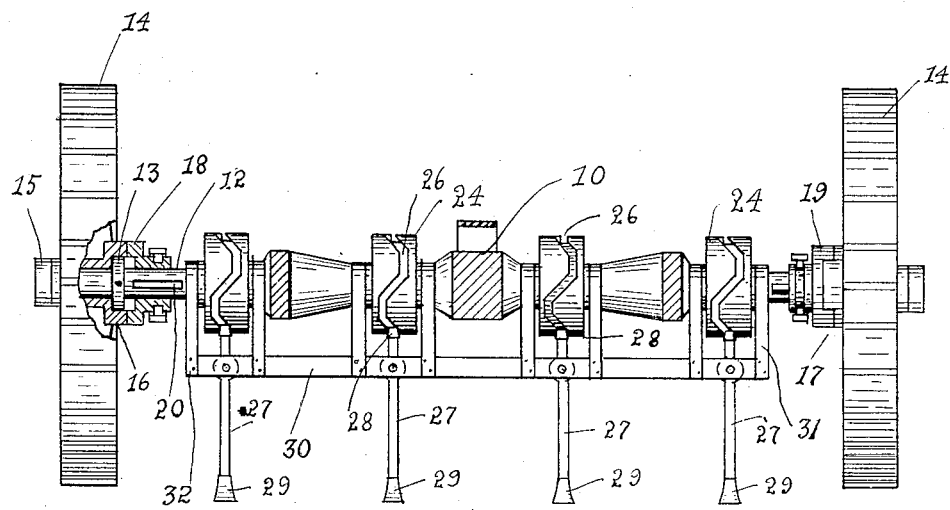
Fig. 2 is a rear end elevation with parts in section.

Referring to the drawings 10 is the main frame, to the front end of which a tongue 11 is secured when the machine is to be drawn by animals. The tongue can be omitted when motor power is used to draw the machine. An axle 12 is mounted in frame 10. Near each end is secured a collar, one of which 13 is shown in Fig. 2. Wheels 14 are revolubly mounted on the axle outside the collars and are held on the axle by nuts 15 which are screwed on the ends of the axle. The wheels on their inner sides are provided with the female members 16 and 17 of clutches, the male members 18 and 19 of the clutches are slidably mounted on the axle and are caused to rotate therewith by splines, one of which 20 is shown in Fig. 2. Members 18 and 19 are operated by levers 21 and 22 which are connected by link 23 so that they will move in unison when either is operated. I prefer to operate both by the longer arm of lever 21. Cams 24 are adjustably mounted on axle 12 by set screws 25 so as to change their positions to permit the machine to be operated in different fields where the rows of beets are differently spaced from those of other fields. These cams are provided in their periphery with cam grooves 26 in which the ends of the cutter bars 27 work. Alternate portions of these cam grooves are in a plane parallel to the plane of the revolution of the driving wheels, while the other portions are angular thereto. The ends of these bars which enter the cam grooves are provided with friction rollers 28. Bars 27 are forked at their lower ends and have secured thereto cutter knives 29 and are rockably secured to a U-shaped cutter bar frame which is rockably hung on axle 12. This cutter bar frame is composed of the transverse bar 30 and end members 31 and 32 which are swingingly mounted on axle 12. These end members have attaching lugs to which are pivotally connected jointed pull rods 33 and 34 whose other ends are pivotally secured to bearings 35 mounted on frame 10. A jointed pull rod 36 is similarly attached to bar 30 and to frame 10. Pull rod 36 is connected by link 37, see Fig. 3, to the short arm of bell crank lever 38 that is pivoted in bearings secured to the main frame. The longer arm of lever 38 carries a pawl 39 which engages a ratchet 40 secured to frame 10. A seat 41 is secured to frame 10.

In the operation of my machine it is drawn along the rows of beet plants to be thinned, with the cutter bar mountings over the center of the rows of plants with clutches thrown into engagement, so that the wheels rotate the axle. The rotation of the axle causes the cams to rock the cutters transversely the rows of plants. It will be observed that the cam grooves will give these cutters an intermittent motion. A part of the time the cutters are not moving transversely and this period of inaction is timed so as to leave the desired number of plants in the row. As the cutters move transversely they cut out the plants in the row as they pass through it. The depth to which the cutters enter the soil can be regulated by lever 38, and they can be entirely withdrawn from the soil when turning, or moving from one field to another by this lever. The length of the cutters and their transverse speed of movement determine the spaces in which the plants are cut out. The transverse speed of movement and periods of rest are determined by the cam grooves which are designed to suit the soil in which the beets are grown. My machine can be used to thin other plants in rows.

Having described my invention I claim:

A plant thinning machine comprising, a main frame; an axle revolubly mounted therein; wheels revolubly mounted on said axle; clutches adapted to lock said wheels to said axle; cams having cam grooves in their periphery mounted on said axle, portions of said grooves being in a plane parallel, and other portions being angular to the plane of revolution of the driving wheels; a cutter bar frame swingingly mounted on said axle; cutter bars rockingly mounted in said last frame for transverse movement, the upper ends of said cutter bars entering said cam grooves; jointed pull rods secured to the main and cutter bar frames; and means to position said cutter bar frame.

In witness that I claim the foregoing I have hereunto subscribed my name this 26th day of August, 1918.

W. R. GWIN.